United States Patent [19]
Coleman

[11] Patent Number: 5,933,475
[45] Date of Patent: *Aug. 3, 1999

[54] SYSTEM AND METHOD FOR TESTING A TELECOMMUNICATIONS APPARATUS

[75] Inventor: William A. Coleman, Edina, Minn.

[73] Assignee: Interactive Quality Services, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/868,876

[22] Filed: Jun. 4, 1997

[51] Int. Cl.$^6$ .............................. H04M 1/24; H04M 3/08; H04M 3/22

[52] U.S. Cl. .................................. 379/1; 379/10; 379/15; 379/32

[58] Field of Search .................................. 379/1, 6, 9–10, 379/12, 15, 16–18, 20, 23–24, 27, 29, 31, 32, 34, 265, 308, 309

[56] References Cited

U.S. PATENT DOCUMENTS

| | | | |
|---|---|---|---|
| 4,314,110 | 2/1982 | Breidenstein et al. | 179/175.2 R |
| 4,405,833 | 9/1983 | Cave et al. | 179/1 MN |
| 4,580,016 | 4/1986 | Williamson | 179/175.3 R |
| 4,629,836 | 12/1986 | Walsworth | 379/12 |
| 4,953,195 | 8/1990 | Ikemori | 379/33 |
| 5,007,000 | 4/1991 | Baldi | 364/513.5 |
| 5,065,422 | 11/1991 | Ishikawa | 379/11 |
| 5,311,588 | 5/1994 | Polcyn et al. | 370/377 |
| 5,359,646 | 10/1994 | Johnson et al. | 379/27 |
| 5,365,574 | 11/1994 | Hunt et al. | 379/88 |
| 5,371,787 | 12/1994 | Hamilton | 379/386 |
| 5,384,822 | 1/1995 | Brown et al. | 379/10 |
| 5,428,679 | 6/1995 | French | 379/201 |
| 5,524,139 | 6/1996 | Jones | 379/67 |
| 5,553,121 | 9/1996 | Martin et al. | 379/88 |
| 5,572,570 | 11/1996 | Kuenzig | 379/1 |
| 5,579,368 | 11/1996 | Van Berkum | 379/9 |
| 5,633,909 | 5/1997 | Fitch | 379/10 |

FOREIGN PATENT DOCUMENTS

WO98/27711  6/1998  United Kingdom ............ H04M 3/32

OTHER PUBLICATIONS

"A&G Graphics Interface, Inc.—Home Page", Company Brochure, A&G Graphics Interface, Inc., http://customvoice.com/aghome.htm, 1 p. (1996).

"Custom Voice 3.0", Product Brochure, A&G Graphics Interface, Inc., http://customvoice.com/product.htm, 2 p. (1996).

"Advanced Recognition Technologies—Home Page", Company Brochure, Advanced Recognition Technologies, Inc., http://www.artcomp.com/ (1996).

"AT&T Advanced Speech Products Group", Product Brochure, American Telephone & Telegraph, http://www.at-t.com/aspg/, 1 p. (1996).

"AT&T Watson Advanced Speech Applications Platform", Product Brochure, American Telephone & Telegraph, http://www.att.com/aspg/blasr.html, 3 p. (1996).

"1996 Full Line Catalog—Telecommunications Test Equipment", Product Brochure, Ameritec Corporation, 16 p. (1996).

(List continued on next page.)

Primary Examiner—Paul Loomis
Assistant Examiner—Binh K. Tieu
Attorney, Agent, or Firm—Schwegman, Lundberg, Woessner, and Kluth, P.A.

[57] ABSTRACT

A method for testing a telecommunications system. The method includes initializing parameters of a telecommunications tester. A test sequence is executed from instructions stored in the telecommunications tester. The duration of at least one speech audio signal or period of silence produced by the telecommunications system is measured. The result of the measuring step is compared with an expected value to determine whether the appropriate speech audio was produced by the telecommunications system.

26 Claims, 8 Drawing Sheets

OTHER PUBLICATIONS

"AM2—Credit Card Call Testing", Product Brochure, Ameritec Corporation, 5 p. (Jan. 12, 1994).

"AM2—Voice Mail Testing", Product Brochure, Ameritec Corporation, 5p. (Feb. 18, 1994).

"AM2 Niagara—Voice Replay Option", Product Brochure, Ameritec Corporation, 2 p. (Mar. 10, 1994).

"AM2 Niagara—Tone Validation in Presence of Speech", Product Brochure, Ameritec Corporation, 3 p. (Oct. 31, 1994).

"AM2, Squirt (TM) & Crescendo (R)—FeatureCall (TM)", Product Brochure, Ameritec Corporation, 2 p. (publicly available at least as early as Jun. 3, 1997).

"AM2–NCS Network Call Simulator", Product Brochure, Ameritec Corporation, 2 p. (Aug. 8, 1995).

"Ameritec AM2–A Analog Bulk Call Generator", Product Brochure, Ameritec Corporation, 6 p. (publicly available at least as early as Jun. 3, 1997).

"Ameritec Bulk Call Generators for C.A.S. Digital Trunks", Product Brochure, Ameritec Corporation, 6p. (publicly available at least as early as Jun. 3, 1997) Trunk Calls.

"Ameritec Bulk Call Generators for C.C.S. Digital Trunks", Product Brochure, 1997) JSDN ppi calls.

"ATM Load Tester", Product Brochure, Ameritec Corporation, 2 p. (Apr. 27, 1994).

"Crescendo(R) Family ", Product Brochure, Ameritec Corporation, 12 p. (publicly available at least as early as Jun. 3, 1997).

"Apple Speech—Home Page", Product Brochure, Apple Computer, Inc., http://www.speech.apple.com/, 1 p. (1996).

"Applied Language Technologies—Home Page", Company Brochure, Applied Language Technologies, http://www.altech.inter.net/, 1 p. (1996).

"Applied Language Technologies—Products and Applications", Company Brochure, Applied Language Technologies, http://www.altech. inter.net/products.htm, 3 p. (1996).

"Applied Language Technologies—Technology", Company Brochure, Applied Language Technologies, http://www.altech.inter.net/technolo.htm, 1 p. (1996).

"Speech Recongnition—Application Guide", Product Brochure, Computer Communications Specialists, Inc., 93 p. (publicly available at least as early as Jun. 3, 1997).

"Controlling Positive Voice Detection (PVD)—Voice Features Guide for MS–DOS", Product Brochure, Dialogic Corporation, Parsippany, NJ, 5 p. (publicly available at least as early as Jun. 3, 1997).

"VR Programmers's Guide for MS–DOS", Dialogic Corporation, Parsippany, NJ, 19 p. (publicly available at least as early as Jun. 3, 1997).

"VR Vocabulary Reference", Dialogic Corporation, Parsippany, NJ, 14 p. (publicly available at least as early as Jun. 3, 1997).

"VR/160 Hardware Installation Guide", Dialogic Corporation, Parsippany, NJ, 10 p. (publicly available at least as early as Jun. 3, 1997).

"D/121B (tm)", Product Brochure, Dialogic–Corporation, http://www.dialogic.com/docs/products/d_sheets/1845WEB.HTM, 7 p. (1996).

"Voice SpringWare (tm)", Product Brochure, Dialogic Corporation, http://www.dialogic.com/docs/products/d_sheets/1830WEB.HTM, 9 p. (1996).

"Dragon Systems(R), Inc.—Home Page", Company Brochure, Dragon Systems(R), Inc., http://www.dragonsys.com/, 1 p. (1996).

"IBM—Voice Recognition—Technology Spotlight", Product Brochure, International Business Machines, http://www.software.ibm.com/workgroup/voicetyp/bttech.html, 2 p. (Publication Date Unknown, Printed off of World Wide Web on Nov. 30, 1996).

"IBM—VoiceType", Product Brochure, International Business Machines Corporation, http://www.software.ibm.com/workgroup/voicetyp/, 1 p. (Publication Date Unknown, Printed off of World Wide Web on Nov. 30, 1996).

"MIT Lincoln Laboratory—Speech Systems Technology Group", Home Page, Http://www.11.mit.edu./SST/, 1 p. (Publication Date Unknown, Printed off of World Wide Web on Nov. 30, 1996).

"MIT Lincoln Laboratory—Speech Systems Technology Group—Publications", Web Site, http://www.11.mit.edu/SST/pubs.html, 9 p. (Publication Date Unknown, Printed off of World Wide Web on Nov. 30, 1996).

"PureSpeech, Inc.—Home Page", Company Brochure, PureSpeech, Inc., http://www.speech.com/, 1 p. (1996).

"ReCite!. . . from PureSpeech", Product Brochure, PureSpeech, Inc., http://www.speech.com/recite.html, 2 p. (1996).

Breidenstein, C.J., "A Multi–Level Man–Machine Interface for Specification of Test Scenarios in Intelligent Network Systems", Product Brochure, Redcom Laboratories, Inc., Victor, N.Y., 3 p. (1995).

"OASYS Interface—Hardware Development Platform", Product Brochure, Redcom Laboratories, Inc., Victor, N.Y., 1 p. (publicly available at least as early as Jun. 3, 1997).

"Switchability (tm)", Product Brochure, Redcom Laboratories, Inc., Victor, N.Y., 11 p. (publicly available at least as early as Jun. 3, 1997).

"Customized Off–The–Shelf Load Testing—Switchability (tm)", Product Brochure, Redcom Laboratories, Victor, N.Y., Inc., 1 p. (publicly available at least as early as Jun. 3, 1997).

"TTG (R) Mini–Terminal", Product Brochure, Redcom Laboratories, Inc., Victor, N.Y., 2 p. (publicly available at least as early as Jun. 3, 1997).

"TTG—Tele Traffic Generator", Product Brochure, Redcom Laboratories, Inc., Victor, N.Y., 5 p. (publicly available at least as early as Jun. 3, 1997).

"TTG V5.2 Product Announcement", Technical Bulletin, Redcom Laboratories, Inc., Victor, N.Y., 2 p. (May 15, 1991).

"TTG V6.0 Product Announcement", Technical Bulletin, Redcom Laboratories, Inc., Victor, N.Y., 3 p. (Feb. 24, 1995).

"TTG V7.0 Product Announcement", Technical Bulletin, Redcom Laboratories, Inc., Victor, N.Y., 2 p. (Mar. 13, 1995).

"Hammer Trunk & System Quality Test Suite (TSQ)", Product Brochure, Transaction Environments, 28 p. (Jan. 1994).

"Voice Connexion, Inc.—Home Page", Company Brochure, Voice Connexion, Inc., http://www.access1.com/vcx/, 1 p. (1996).

"VCS & Dialogic VR/40", Product Brochure, Voice Control Systems, Inc., http://voicecontrol.com/vr–40.html, 2 p. (Publication Date Unknown, Printed off of World Wide Web on Nov. 30, 1996).

"VCS—Technology", Product Brochure, Voice Control Systems, Inc., http://voicecontrol.com/technlgy.html#speaker–independent, 2 p. (Publication Date Unknown, Printed off of World Wide Web on Nov. 30, 1996).

"VCS—The Vocabulary Leader Worldwide", Product Brochure, Voice Control Systems, Inc., http://voicecontrol.com/vocabs.html, 2 p. (Publication Date Unknown Printed off of World Wide Web on Nov. 30, 1996).

"VCS Products and Technologies", Product Brochure, Voice Control Systems, Inc., http://voicecontrol.com/vcs–tech.html, 2 p. (Publication Date Unknown, Printed off of World Wide Web on Nov. 30, 1996).

"Voice Control Systems, Inc.", Company Borchure, Voice Control System, Inc., http://voicecontrol.com/, 2 p. (Publication Date Unknown, Printed off of World Wide Web on Nov. 30, 1996).

"Voice Processing Corporation—Home Page", Company Brochure, Voice Processing Corporation, http://www.vpro.com, 1 p. (Publication Date Unknown, Printed off of World Wide Web on Nov. 30, 1996).

"The VPro Product Line", Product Brochure, Voice Processing Corporation, http://www.vpro.com/products.html, 1 p. (Publication Date Unknown, Printed off of World Wide Web on Nov. 30, 1996).

"VPC—Corporate Background", Company Brochure, Voice Processing Corporation, http://www.vpro.com/vpccorp.htm, 2 p. (Publication Date Unknown, Printed off of World Wide Web on Nov. 30, 1996).

"VPro Software", Product Brochure, Voice Processing Corporation, http://www.vpro.com/software.html, 2 p. (Publication Date Unknown, Printed off of World Wide Web on Nov. 30, 1996).

Gladstone, S., In: *Testing Computer Telephony Systems and Networks, First Edition*, Book Crafters, Chelsea, MI, excerpts (1994).

SYSTEM AND METHOD FOR TESTING A TELECOMMUNICATIONS APPARATUS

TECHNICAL FIELD OF THE INVENTION

The present invention relates generally to the field of communications and, in particular, to a system and method for testing a telecommunications apparatus.

BACKGROUND OF THE INVENTION

There are many applications of automated systems used for the testing of telecommunication systems and devices attached to telephone lines. These automated telephone tester systems launch telephone calls to the telecommunication system under test to exercise certain capabilities and/or validate the proper operation of the system under test by determining the responses to the telephone test call sequence of stimulus or inputs. Changing conditions or errors in the system under test may cause that system to play different speech audio than is expected in response to each step of a testing sequence. For example, an automated test call into a telephone banking system might dial the telephone access number, determine that the expected speech audio greeting and prompt is played within a few seconds, dial additional DTMF (touch tone) digits to input an account number, determine that the expected speech audio response is played within a few seconds, and so forth.

The telephone-related systems that are typically tested with automated testers include Private Branch Exchange (PBX) systems, Automatic Call Distribution (ACD) systems, telephone company Central Office (CO) telephone switching systems, voice messaging systems, call prompting systems, telephone debit card systems, international telephone callback systems, telephone network call routing control systems, interactive voice response systems, voice processing systems, call-back messaging systems, facsimile processing systems, telephone modems, predictive dialing systems, and combinations of such systems that may be known as computer-telephone integration (CTI) arrangements. These CTI arrangements may provide functions like inbound or outbound call screen pop to coordinate the delivery of telephone calls with computer display screen of relevant information, coordinated call/screen transfer, control of telephone functions from a computer workstation or server, consolidation of management reporting information from two or more telephone-related systems, and so forth.

The telephone test call connections may be direct and local in the same room or through a public or private telephone communication network. Verification of features, functions, interfaces, integrations, capacities, and availability are among the typical objectives of a testing process. As the services these systems provide become more important to business success and the custom integrations become more complex, the requirements for definitive automated validation testing increases proportionately. The use of these automated testers is particularly important when the test is designed to validate the capacity of the system under test to monitor, control, respond to, handle, or track the results of telephone call traffic.

These automated telephone tester systems have several things in common. The automated testers are microprocessor based. Multi-tasking of the microprocessor is required to launch, control, and store information about multiple simultaneous telephone test calls, so they make use of a multi-tasking operating system such as Windows NT, UNIX, or some proprietary operating system. These automated testers typically include one or more hardware interfaces to multiple telephone lines for launching or receiving telephone test calls. These automated testers have some means of defining and storing the test call sequences of stimulus, inputs and other parameters. These test call sequences typically include the telephone number to be dialed, subsequent additional DTMF or MF (multi-frequency) or rotary dial digits to be dialed, other tones to be transmitted on the test call and so forth. More advanced testing systems also offer capabilities to offer inputs by playing recorded speech files in lieu of dialing DTMF digits.

A capability of any telecommunications tester is found in the determination of how and when a test call makes its way through a telephone network and is answered by the system under test. The general term for this determination is call progress detection. This term refers to the determination of things like dial tone, busy tone, ring-back tone, SIT tri-tones, DTMF (touch tone) digit tones, periods of silence, answer detection, and on-hook detection. Current telephone testing systems generally make use of telephone interface hardware from a manufacturer like Dialogic Corporation, Natural Microsystems, or Rhetorix. These testing systems rely upon the call progress detection techniques made available by the manufacturer of the telephone line interface hardware.

The art of call progress detection is based upon sensing one or more audio frequencies for specific periods of time. For example, North American standard dial tone is a simultaneous combination of 350 Hertz and 440 Hertz tones with extended duration of several seconds. North American standard station busy tone is a combination of 480 Hertz and 620 Hertz tones with a duration of 500 milliseconds, followed by silence for 500 milliseconds, followed by the combined tones for 500 milliseconds, and so forth. North American standard telephone network congestion busy tone uses the same combination of 480 Hertz and 620 Hertz tone frequencies with 250 millisecond duration of the tone and silence periods. Other call progress tones use specific frequencies and patterns of tone alternating with silence. Answer detection is generally based upon the detection of audio with frequency components that are characteristic of human speech, the cessation of a ring-back tone sequence, or an electrical or signaling condition change on the calling telephone line.

FIG. 3A shows the progress of a typical telephone test call. At T0, the destination telephone number has been dialed. At T1, the ring-back tone sequence begins with a period of audio. At T2, the first ring-back tone audio period ends. At T3, the second ring-back tone audio period begins. At T2, most call progress detection methods will determine that a ring-back tone sequence is in progress. At T4, the second ring-back tone audio period ends. At T5, speech audio begins as the call is answered and a greeting is played.

Another key capability of any telecommunications tester is found in the determination of how and when the system under test responds on the telephone line to the sequence of stimuli or inputs being generated during each test call. More advanced testing systems may offer capabilities for direct or LAN data communication with the system under test to determine other information about responses to the telephone test calls. With the widespread use of voice response technology, the validation testing of many telephone-related systems requires one or more determinations that certain speech audio phrases are played by the system under test at specific points of a test call sequence. The Hammer® telecommunication system tester determines that specific speech phrases have been played by means of voice recognition technology and methods as defined in U.S. Pat. No. 5,573,570 (Kuenzig). One shortcoming of the Kuenzig Patent is that voice recognition technology is costly to equip in a testing system. Another shortcoming of the Kuenzig Patent is that voice recognition techniques may be adversely affected by noise and other conditions on telephone lines.

For the reasons stated above, and for other reasons stated below which will become apparent to those skilled in the art upon reading and understanding the present specification, there is a need in the art for testing system for telecommunications systems that overcomes the problems identified above.

SUMMARY OF THE INVENTION

The above mentioned problems with testing systems and other problems are addressed by the present invention. A system and method for testing telecommunications systems is described which uses audio time analysis to determine whether the telecommunications system is operating properly.

In particular, an illustrative embodiment of the present invention includes a method for testing a telecommunications system. The method initializes parameters of a telecommunications tester. A test sequence is executed from instructions stored in the telecommunications tester. The duration of at least one speech audio signal or period of silence produced by the telecommunications system is measured. The result of the measuring step is compared with an expected value to determine whether the appropriate speech audio was produced by the telecommunications system.

In another embodiment, a method for testing a telecommunications system that provides visual information regarding a caller to an operator is provided. The method launches a telephone call to the telecommunications system which routes the call to an operator and displays visual information for the operator. A sequence of interactive queries over the telecommunications system is executed. Signals that represent non-speech responses to the queries are stored. The responses provided by the operator over the telecommunications system are evaluated.

In another embodiment, a method for testing automated calling systems is provided. The method includes receiving a call from the automated calling system. The method further determines whether to answer the call. When not answering the call, the method may cause a no-answer condition or generate a busy signal. When answering the test call after some period of delay, the method selectively provides a signal to the telecommunications system from a set of signals expected to be received by the telecommunications system so as to test the ability of the automated calling system to determine the nature of the answering person or device. The method further executes a number of interactive queries with the telecommunications system. The method also receives and stores the non-speech responses the telecommunications system. Finally, the responses are evaluated.

In another embodiment, a method for testing call routing arrangements in a telecommunications system with multiple physical locations is provided. The method launches a call to the telecommunications system. The method further determines the expected physical location for the call to be routed by the telecommunications system. The method further determines the actual physical location to which the telecommunications system routed the call and stores the results of the determinations.

In another embodiment, a method for testing the service level of an active telecommunication system is provided. The method includes launching a telephone call to the telecommunications system during normal operation of the telecommunications system. A test sequence is executed. The duration of at least one speech audio response signal or period of silence generated by the telecommunications system during the test sequence is measured. The measurement is stored. The method repeats the steps of launching, executing, measuring and storing in order to obtain additional measurements on the operation of the telecommunications system. The method compares the measurements with expected values. Finally, the method reports the results of the comparison.

An object of one embodiment of the invention is to determine whether specific speech audio phrases are played by a telephone-related system under test. This determination enables automated testing and validation of the correct operation or robust operation of the telephone-related system under test.

Another object of one embodiment of the invention is to determine whether specific speech phrases are played by a telephone-related system with a method that is less costly than current speech recognition technology.

Another object of one embodiment of the invention is to determine whether specific speech phrases are played by a telephone-related system with a method that is simpler that voice recognition and therefore less susceptible to errors due to noise and other conditions on telephone lines.

These objectives are achieved in embodiments of the present invention by new and innovative use of audio duration measurement methods previously applied to call progress tone determination. This method is called audio time analysis.

DETAILED DESCRIPTION OF THE INVENTION

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
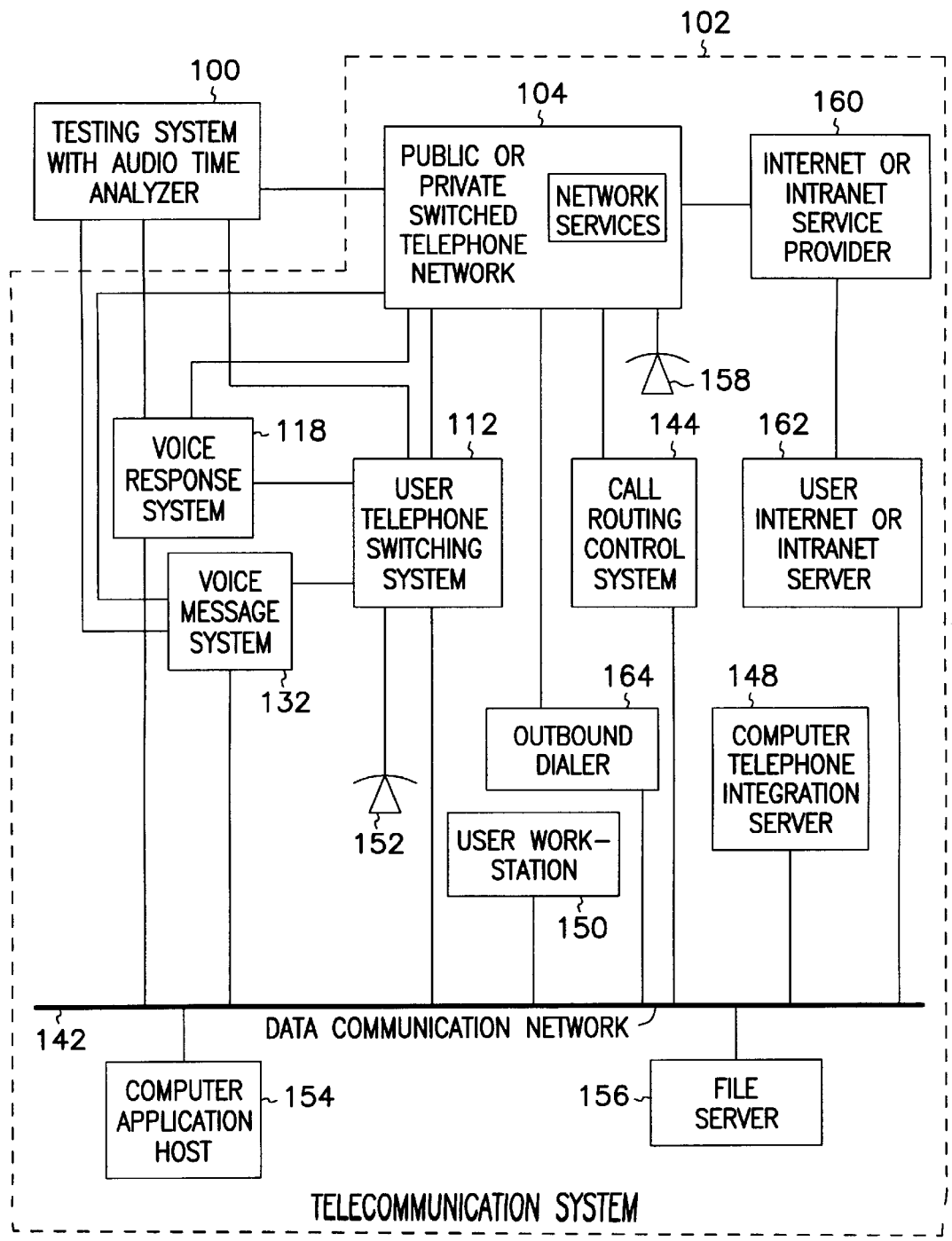
FIG. 1 is a block diagram of an embodiment of the present invention including a testing system with audio time analyzer that is coupled to a telecommunication system according to the teachings of the present invention.
Figure 3A:
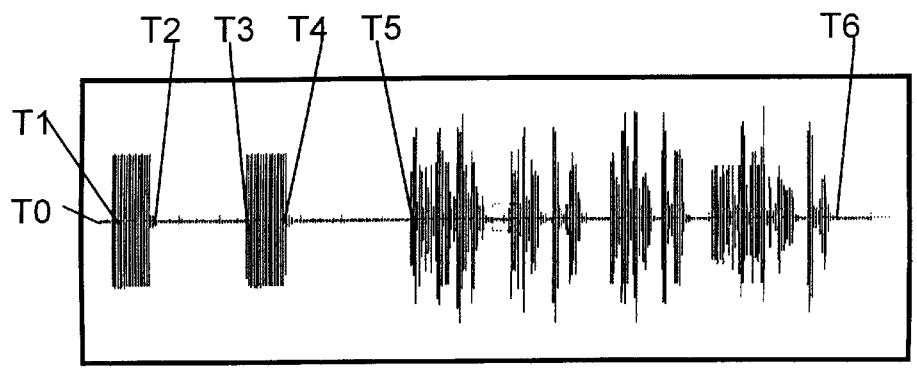
FIGS. 3A, 3B, and 3C are timing diagrams that illustrate exemplary signals produced by a telecommunications system during a test sequence.
Figure 3B:
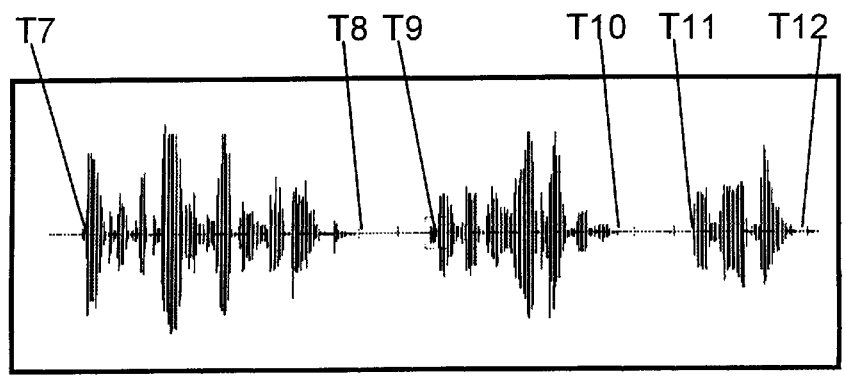
Figure 3C:
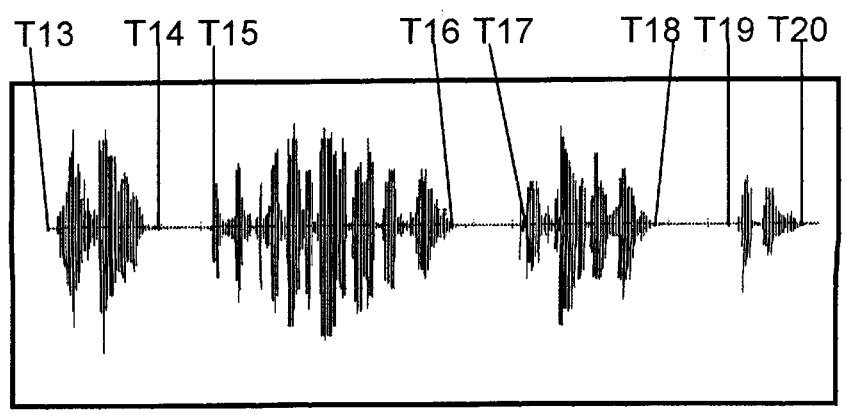

FIG. 1 is a block diagram of an embodiment of the present invention including testing system 100 with audio time analyzer that is coupled to telecommunication system 102. According to one aspect of this embodiment, testing system 100 evaluates speech audio signals produced by telecommunications system 102 in response to inputs provided by testing system 100. These speech audio signals from telecommunications system 102 are typically played by retrieving previously recorded speech audio from some storage media. In another case, the speech audio may be newly created in real time through a process of speech synthesis. In either case, the speech audio that may be played by telecommunications system 102 at certain steps of a repetitive testing process is virtually identical from call to call because it is retrieved or synthesized from the same source by means of the same machine process. This consistency of speech audio generation allows testing system 100 to determine the accuracy of telecommunications system 102 by analyzing the timing of the speech audio signals produced by telecommunications system 102 in response to to a stimulus or audio input(s) from testing system 100. In other words, testing system 100 can determine whether the correct message was generated by telecommunications system 102, not by recognizing the speech content of the message, but by determining how long it took to play all or portions of the message. By way of example, FIG. 3B and FIG. 3C illustrate the relative duration and timing of two different messages that are typical of speech audio messages commonly found in telecommunications systems. In FIG. 3B, the audio pattern for "Thank you for calling ABC Bank. Please enter your account number. Then dial pound." begins at T7 and ends at T12. The first phrase "Thank you for calling ABC Bank." has a duration from T7 to T8. The second phrase "Please enter your account number." has a duration from T9 to T10. The third phrase "Then dial pound." has a duration from T11 to T12. The three phrases in FIG. 3B have different durations that are characteristic of the audio that is repeatedly played from the same stored source or synthesized from the same source by means of the same machine process. If all three phrases in FIG. 3B are recorded as a single audio file, then the entire duration of the message from T7 to T12 and the two periods of silence from T8 to T9 and from T10 to T11 are also characteristic of the audio that is repeatedly played from the same stored source or synthesized from the same source by means of the same machine process. In FIG. 3C, the audio pattern for "We're sorry. The system is unavailable at this time. Please call again later. Goodbye." begins at T13 and ends at T20. The first phrase "We're sorry." has a duration from T13 to T14. The second phrase "The system is unavailable at this time." has a duration from T15 to T16. The third phrase "Please call again later." has a duration from T17 to T18. The fourth phrase "Goodbye." has a duration from T19 to T20. The four phrases in FIG. 3C have different durations that are characteristic of the audio that may be repeatedly played from the same stored source. If all four phrases in FIG. 3C are recorded as a single audio file, then the entire duration of the message from T13 to T20 and the three periods of silence from T14 to T15, and from T16 to T17, and from T18 to T19 are also characteristic of the audio that may be repeatedly played from the same stored source. The entire speech audio message from T13 to T20 has a different duration from the entire speech audio message from T7 to T12.

In this embodiment, testing system 100 evaluates the duration of a period or periods of speech audio using industry standard methods. The duration of the period or periods of speech audio is measured in milliseconds. Brief periods of silence in between periods of speech audio may also be measured and separately identified. By measuring the duration of a speech audio period in milliseconds, a characteristic time duration number is created. The audio time analysis process does not require recording or storing the actual audio found in the measured audio period or storing a string of values that are derived from frequency domain calculations on a portion of actual audio, and does not involve comparison of the actual audio with any other audio recording, stored audio file or string of values as is done in the process of speech recognition. In the current invention, no costly voice recognition hardware or software are used.

To determine that a specific speech audio has been played by telecommunications system 102, the audio time analysis process compares one or more time duration numbers with the results of measurements made on other test calls where the content of the speech audio was independently identified. In one embodiment, this means that prior to testing a system, an operator would listen to the speech audio produced by the system to be tested at different points during its operation. The duration of these speech audio signals would be measured and one or more values or ranges of values stored for use in analyzing the operation of the system under test.

The determination that an audio signal over a telephone line contains characteristic human speech frequencies is a standard capability of the telephone line interface hardware and associated software products that are used throughout the industry. The preferred implementation is found in Dialogic hardware and associated Springware® software, available from Dialogic Corporation, of Parsippany, N.J. 07054, in a Microsoft Windows NT environment.

Speech audio signals from telecommunications system 102 may contain two or more speech audio periods interspersed with one or more periods of silence (i.e., no speech audio). This condition may develop due to the natural pauses between sentences, the phrases in a complete sentence, the normal operation of speech synthesis, or brief pauses between pre-recorded words or phrases that are concatenated by telecommunication system 102 to form a complete sentence. The audio time analysis method develops one or more characteristic "duration number(s)" for a series of audio and silence periods by means of a variable silence timeout ("ST") parameter.

If the testing objective is to determine that a specific series of phrases or sentences have been played by telecommunications system 102, then the ST parameter might be set for a relatively long period of time, e.g., three seconds. This setting causes any periods of silence to be ignored that have a duration of less than three seconds between audio periods. In this example, the characteristic duration number for the entire audio period will be a measurement of the duration of the entire phrase or series of phrases from telecommunications system 102, e.g., from the beginning of the first period of audio until the end of the last period of audio before three or more seconds of silence was detected by testing system 100.

If the testing objective is to determine that a specific phrase has been played in a sequence of phrases, then the ST parameter might be set for one millisecond. This setting causes one or more individual audio periods to be measured for duration if they have at least a one millisecond period of silence between them. Periods of silence in between the speech audio periods may also be measured for time duration. A default timer stops the audio time analysis method if any period of silence exceeds the timer period. This process creates one or more time duration numbers that are characteristic of the speech audio response. To determine that a specific speech audio has been played by telecommunication system 102, the audio time analysis process compares the time duration number(s) with the results of measurements made on other test calls where the content of the speech audio was independently and manually identified.

The testing and evaluation of the correct and robust operation of telecommunication system 102 may also involve measuring the time after a stimulus or input from testing system 100 until there is a response from telecommunication system 102. This time period, referred to as the "response time duration," is measured from the end of each test stimulus or input from testing system 100 until the beginning of the audio response from telecommunications system 102. The response time duration may also be characteristic of the audio response that is produced by telecommunications system 102. Thus, measurement of the response time duration may provide determination of the audio phrase by comparing the response time duration with the results of response time measurements made on other test calls where the content of the speech audio was independently and manually identified.

Testing system 100 can be used to test a wide variety of telecommunications systems, depicted collectively as telecommunication system 102 in FIG. 1. It is understood that telecommunication system 102 may include any one or more of the exemplary subsystems shown in FIG. 1, alone or in combination with other subsystems. Thus, telecommunications system 102 is shown by way of example and not by way of limitation. The various subsystems shown in FIG. 1 are shown together to facilitate explanation of various functions that can be performed by testing system 100.

Telecommunication system 102 may contain one or more elements or subsystems that have some role to play in switching telephone calls, originating telephone calls, receiving telephone calls, controlling telephone calls, or handling data associated with a telecommunication function that are used or tested by testing system 100 during a test sequence. For example, testing system 100 is coupled to public or private switched telephone network 104 so as to provide access to various subsystems of telecommunications system 102. Network 104 comprises, for example, a switching or transmission path for voice or data communications. Testing system 100 is also coupled to user telephone switching system 112, voice response system 118 and voice message system 132 of telecommunications system 102. Through these connections, testing system 100 is able to selectively exercise the various subsystems of telecommunications system 102 which are described in more detail below.

Voice response system 118 is coupled to network 104, user telephone switching system 112 and data communication network 142. Voice response system 118 may be used to terminate or switch telephone lines or data communication circuits. Voice response system 118, as a further example, may be used to interact with telephone callers through speech audio messages, prompts, tones, and other signaling methods to route calls, provide access to information, receive information, store speech audio messages, and other related functions.

User telephone system 112 is coupled to network 104, data communication network 142 and a number of terminals 152. User telephone system 112 comprises, for example, a private branch exchange, automatic call distribution node, central office centrex, or other apparatus that serves as a switching or transmission path for voice or data communications. User telephone system 112 is also coupled to network 104 through outbound dialer 164.

The data communication network 142 comprises, for example, an Ethernet, token ring, ATM, other network, or combination of networks for local or wide area network data communications. The FIG. 1 representation of an Ethernet topology is only an example, not a limitation on the possible topologies or transmission methods of possible data communication networks that may be an element of telecommunication system 102. Additionally, data communication network 142 is coupled to computer application host 154, file server 156, and computer telephone integration server 148. Finally, is coupled to user internet or intranet server 162. User internet or intranet server 162 is coupled to network 104 through internet or intranet service provider 160.

Call routing control system 144 is coupled between network 104 and data communication network 142. Call routing system 144, for example, may be a data processing apparatus used to control the routing of telephone calls in a public or private switched telephone network 104, a user telephone switching system 112, or other telephone switching system. The call routing system 144, for example, may monitor call processing, switching activities and traffic levels in telephone switching systems and make call routing decisions based upon user parameters.

Figure 2:
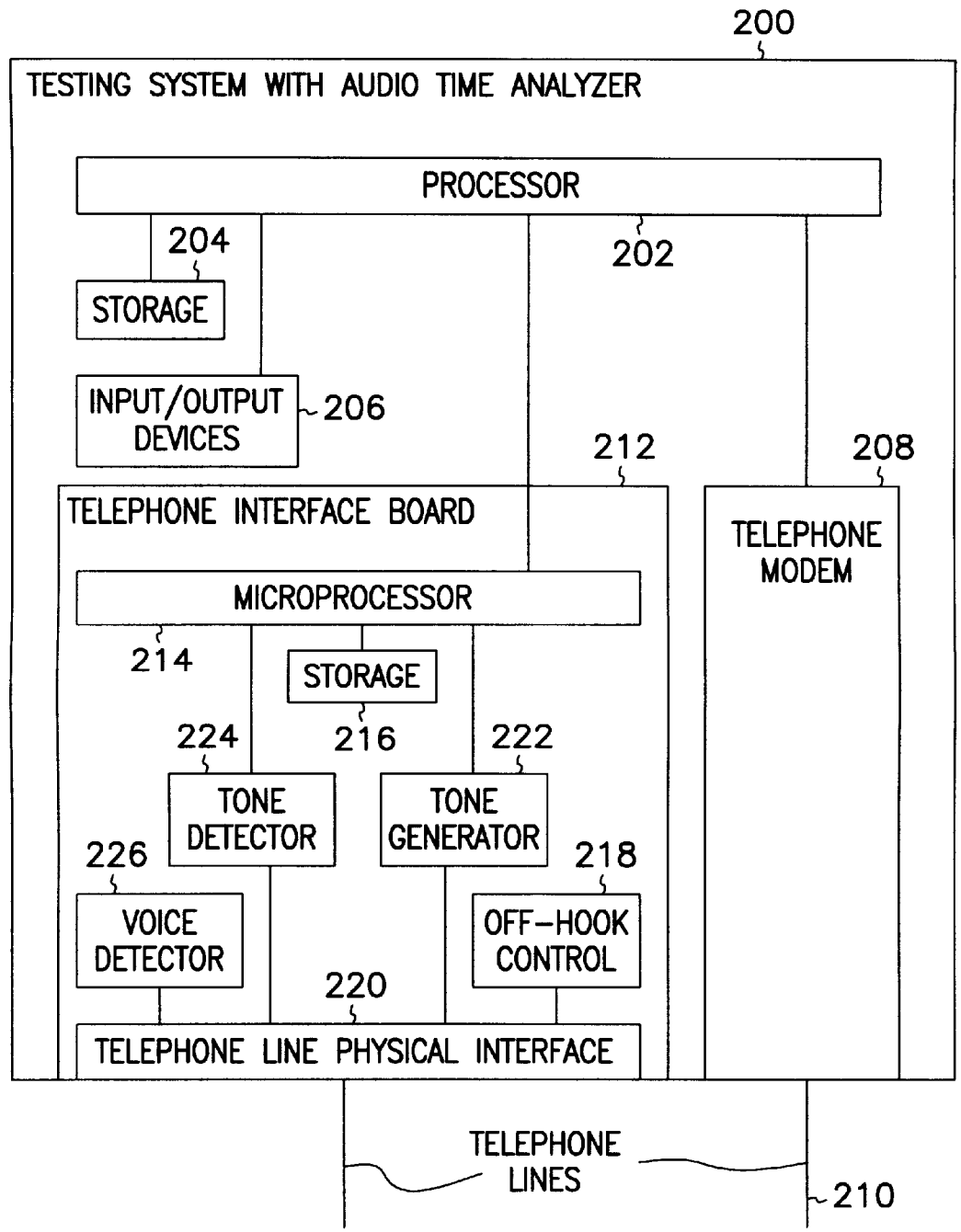
FIG. 2 is a block diagram of an embodiment of a testing system with audio time analyzer according to the teachings of the present invention.

FIG. 2 is a block diagram of an illustrative embodiment of a testing system, indicated generally at 200, with audio time analysis capability for analyzing speech audio according to the teachings of the present invention. Testing system 200 includes processor 202. Processor 202 is coupled to storage 204, input/output devices 206, telephone modem 208 and telephone interface board 212. Telephone lines 210 are coupled to modem 208 and telephone interface board 212.

Telephone interface board 212 may comprise a telephone interface board Model #D41E, manufactured by DIALOGIC Corporation of Parsippany, N.J. Such a telephone interface board typically includes microprocessor 214 and telephone line physical interface 220. Microprocessor 214 is coupled to storage 216. Further, voice detector 226, tone detector 224, tone generator 222, and off-hook control 218 are each coupled between microprocessor 214 and telephone line physical interface 220.

Testing systems 100 and 200 of FIGS. 1 and 2 can be used to perform a wide variety of tests on telecommunications system 102. A number of these test procedures are described in turn below with reference to FIGS. 4 through 8.

Figure 4:
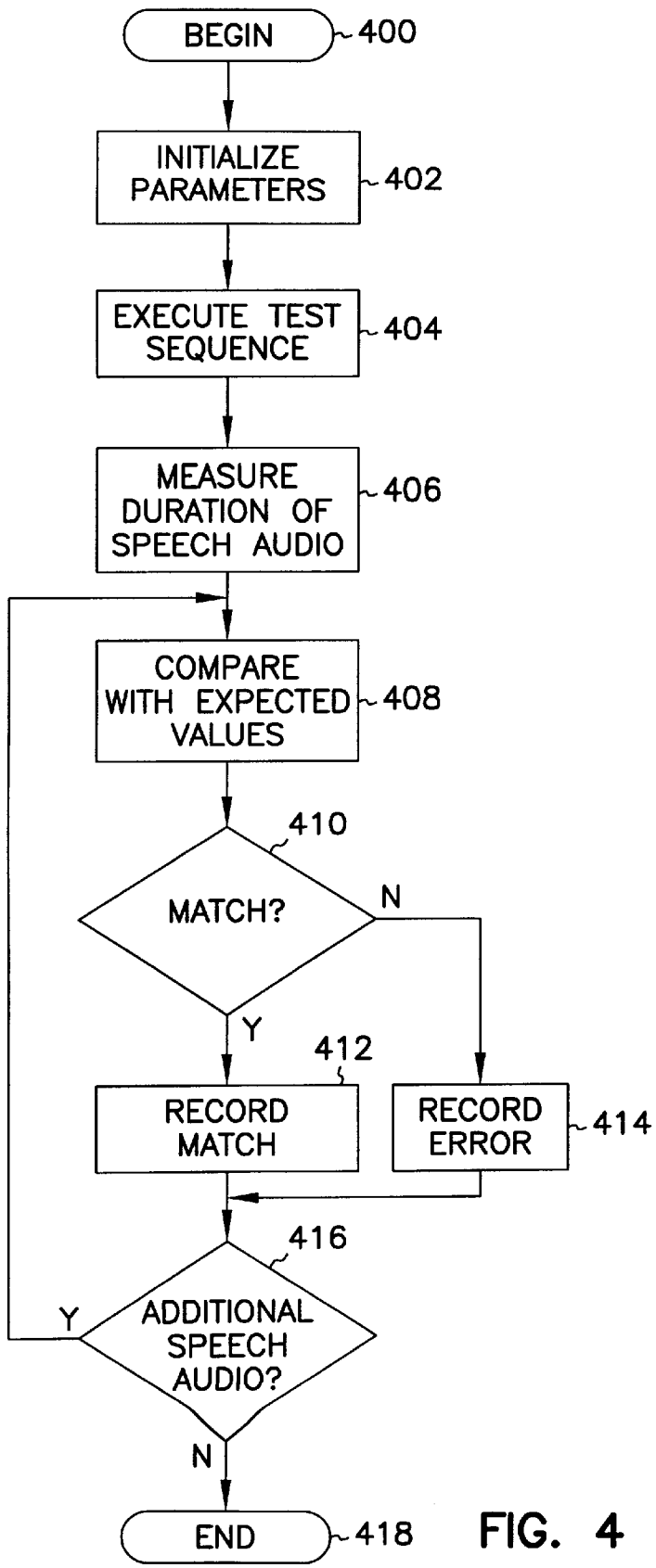
FIG. 4 is a flow chart that illustrates an embodiment of a method for testing a telecommunications system using audio time analysis according to the teachings of the present invention.

FIG. 4 is a flow chart that illustrates an embodiment of a first method for testing telecommunications systems that is referred to as "audio time analysis." With audio time analysis, a testing system can evaluate the operation of a telecommunications system by determining what speech audio occurs in response to certain test scenarios. By measuring the duration of the speech audio and/or the duration of silence in between segments of the speech audio, it is possible to reliably determine which of several expected responses actually occurs at certain points of a test process. Audio time analysis is a direct replacement alternative to voice recognition methods and can be used for:

- feature, function and regression test verification for product integrity;
- feature, function and regression test verification for specific applications or installations;
- performance testing under various loads and patterns of traffic;
- availability and service level testing under normal operating production conditions.

Audio time analysis provides several advantages over existing systems. First, audio time analysis provides significantly lower cost in building and maintaining a testing system due to the elimination of expensive voice recognition hardware and software. Further, audio time analysis provides improved accuracy and reliability over voice recognition due to less sensitivity to noise and other varying conditions on telephone lines.

The audio time analysis method of FIG. 4 is described in conjunction with testing system 200 of FIG. 2. Using this method, testing system 200 is able to determine a characteristic duration for speech response audio. The method begins at block 400. At block 402, processor 202 reads an initialization file from storage 204 that contains, among other things, the test call sequence and a silence timeout "ST" parameter in milliseconds. It is noted that the silence timeout parameter for the Dialogic telephone interface board is referred to as the "answer deglitcher" parameter and is designated "ANSRDGL." The test call sequence is a detailed set of instructions used to generate signals that test a telecommunications system. These instructions typically command telephone interface board 212 to off-hook a telephone line 210, listen for dial tone, and dial certain digits that specify the desired destination telephone number. Telephone interface board 212 reports on the results of the dialing process to processor 202. During the test, processor 202 typically causes telephone interface card 212 to dial additional digits and report on the response to the dialing process to processor 202. Further, during the test, processor 202 interacts with input/output devices 206, telephone modem 208 and telephone lines 210 through the end of the test call when telephone line 210 is returned to an on-hook state.

The ST timing parameter specifies the maximum silence time in between, or at the end of, speech audio information before a decision is made to stop the timing of the duration of the speech audio information. This ST parameter is passed from processor 202 to microprocessor 214 and placed in storage 216. Telephone line interface board 212 may typically have more than one physical telephone line interface. The ST parameter may be a different value for each telephone line 210 and controls the operation of audio time analysis for that telephone line.

At block 404, the test sequence is executed. Processor 202 passes information to microprocessor 214 that contains the digit(s) to be dialed and a request to be informed of call progress detection information that may include the duration of any speech audio that may occur with a trailing period of silence that is at least as long as the previously communicated ST parameter. Various error conditions may typically be reported by microprocessor 214 to processor 202 if the call progress detection mechanism fails for any reason.

Microprocessor 214 uses standard mechanisms created and provided by the manufacturer of the telephone interface board 212 to manage the process of making the telephone call and performing call progress detection. Off-hook control 218 is typically used to seize and release a telephone line 210. Tone detector 224 is typically used to detect dial tone, busy tone, ring-back tone and other call progress indications. Tone generator 222 is typically used to create DTMF digits for dialing purposes. Voice detector 226 is typically used to determine the occurrence of speech audio.

When telephone interface board 212 has determined the result of the dial attempt, microprocessor 214 communicates the information to processor 202. At block 406, testing system 200 measures the duration of the speech audio detected by testing system 200. These measurements are included in the communicated information from microprocessor 214 as a numerical value, typically in milliseconds using the parameter, for example, answer size ("ANSRSIZE") of the Dialogic telephone interface board.

At block 408, processor 202 compares the measured duration of the speech audio to previously determined values or ranges of values. At block 410, the method determines whether the measured duration matches one of the expected durations. A match with the previously determined values or ranges of values is the basis for a determination that the same speech audio word or phrase has been measured. If there is a match, this is recorded in storage 204 at block 412. If the measured duration does not match the expected duration, testing system 200 records the error in storage 204 at block 414.

At block 416, the method determines if there is additional speech audio to be compared. If there is additional speech audio, the method returns to block 408 so as to analyze the speech audio. If there is no additional speech audio, the method ends at block 418.

The test call sequence may include instructions for processor 202 to take a variety of actions based upon the determination that the measured speech audio duration is, or is not, a match to previously determined values or ranges of values. These actions may include branching into different portions of the test call sequence, ending the test call sequence, saving to storage 204 a recording of a portion or all of the test call, or other actions. When a portion of the speech audio is not identifiable, an operator may be used to listen to the speech audio, decipher it, and, if appropriate, measure the duration of the speech audio so that one or more new values or ranges of values can be added to the list of expected values or ranges or values. Additionally, the recorded portion of the test call can be reviewed by an operator to determine whether the system under test worked properly.

A typical test call sequence might include multiple steps of dialing digits and determining any speech audio duration responses or other call progress analysis responses. The response at any step or the pattern of responses at several or all of the steps might be used in the determination that the telecommunications system is performing correctly.

The numerical value of the ST parameter may typically be set from zero seconds to several seconds in increments of one millisecond. For example, at a value of one millisecond, the ST parameter will typically cause a smaller segment of speech audio to be measured for duration. As a further example, at a value of one second, the ST parameter will generally cause the entire speech audio response phrase to be measured for duration. As a further example, at a value of zero seconds, the ST parameter will generally cause the speech audio information to not be measured for duration, but the speech audio will be determined to have occurred with a zero duration. The numerical value of the ST parameter may typically be selected by a human operator of the tester or by an automated selection process that makes several test calls using different numerical values for the ST parameter in a effort to determine which value of the ST parameter most usefully causes duration measurement of portions or all of various speech audio phrases that are encountered in the telecommunications system that is being tested.

A speech audio phrase may have several periods of audio with intervals of silence. It may be useful to measure the duration of each period of audio to create a more complex determination of the entire speech response audio information. This may typically be accomplished in audio time analysis by processor 202 repeatedly instructing the microprocessor 214 to dial a digit such as a comma "," and determine the response. A comma "," is dialed as pause instead of an audible tone, but it has the effect of starting the call progress detection process. By setting the comma "," pause dialing duration at ten milliseconds or less, audio duration measurements may be made for multiple periods of audio and multiple response time periods of silence in a single audio response. Any one or all of the measured durations might typically be used for determination that the speech audio phrase matches a previously measured speech audio phrase.

Figure 5:
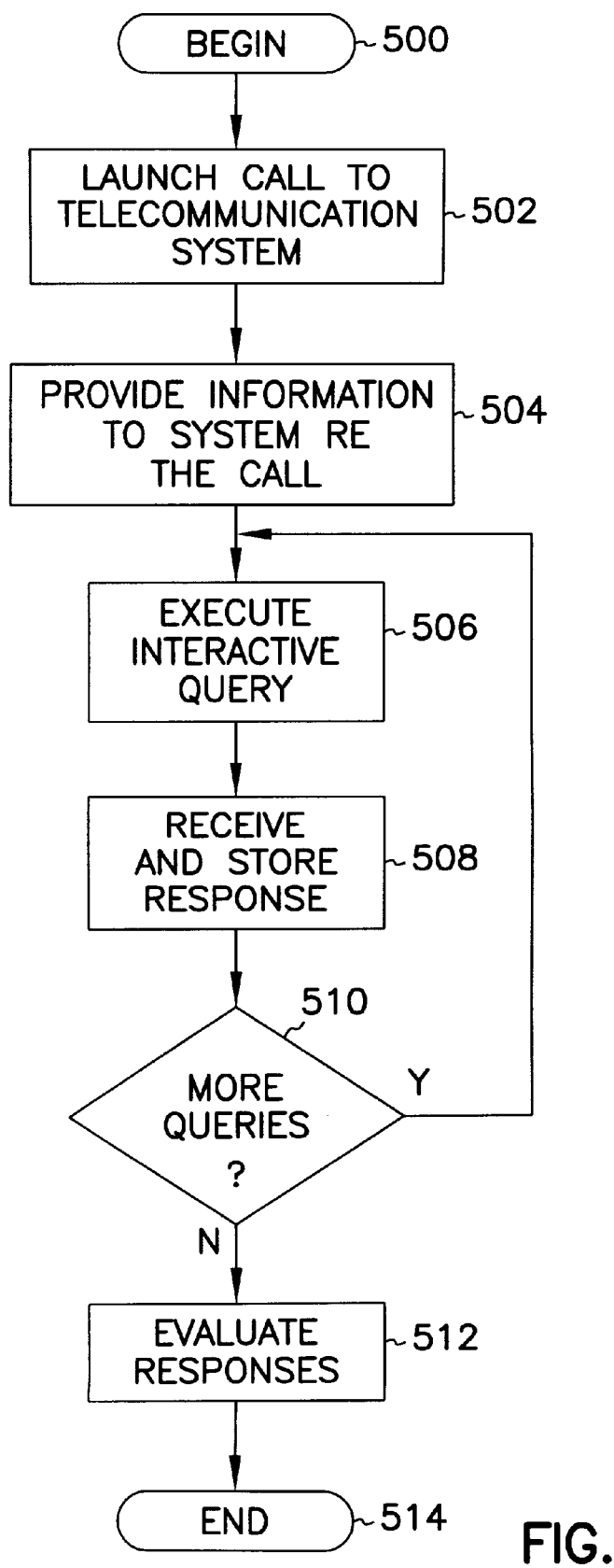
FIG. 5 is a flow chart that illustrates an embodiment of a method for evaluating the speed and accuracy of a "screen pop" according to the teachings of the present invention.

FIG. 5 is a flow chart that illustrates an embodiment of a method for evaluating the speed and accuracy of a "screen pop." A screen pop is used in many telecommunications systems to allow operators quick access to information about a caller at the time the operator begins to speak with the caller. For example, when the caller initiates a call to a bank with a question about an account, some systems initially prompt the caller to enter an account number prior to connecting the caller with an operator. Then, when the caller is routed to the operator, the data for the caller's account is transferred to the computer terminal for the operator handling the call and the information is displayed on the operator's screen to assist the operator in handling the call. The screen pop testing method of FIG. 5 can be used with other functions that involve people receiving telephone calls along with automated presentation of computer information that enables the people to deal with callers in a faster or other improved manner. The method involves testing system 100 or 200 in an interactive transaction with the people (or automated test fixtures) who answer the call to do one or more of the following:

play speech audio that specifies the calling telephone number, the called telephone number, the account number that has previously been entered into the automated system, the length of time that the call has been waiting to be answered, or other related information;

play speech audio that specifies the information that is desired, the type of business transaction, the kind of computer screen presentation that should be on the associated computer workstation, the information that should be present in certain data fields, and other related information;

play one or more speech audio prompts that request certain inputs or responses from the person that indicate certain information about the operation of the automated presentation of computer information;

receive one or more inputs or responses from the person and store the information for reporting, evaluation and other purposes.

The method begins at block 500. At block 502, testing system 100 launches one or more test telephone calls to user telephone switching system 112. These test telephone calls may be made directly to user telephone switching system 112 or through some other means such as a public or private telephone network 104. User telephone switching system 112 makes routing decisions about which telephone 152 will receive the incoming call. A call routing control system 144, a computer telephone integration server 148, or other system (s) may be used in this decision process.

At block 504, the method provides information to telecommunication system 102 about the call. For example, user telephone switching system 112 may inform a computer telephone integration server 148 about the incoming telephone call to telephone 152. Calling telephone number information (ANI), called telephone number information (DNIS) and other information may typically be provided to computer telephone integration server 148. Computer telephone integration server 148 informs a user workstation 150 that the associated telephone 152 is receiving or is soon to receive a telephone call. Information like ANI, DNIS, and associated information may also be provided to the user workstation 150. The user workstation 150 executes certain instructions and typically displays certain information that are based upon the information about the incoming telephone call.

A person answers the inbound telephone call and speaks a greeting to the caller. Testing system 100 determines that the call has been answered and initiates an interactive transaction with the person through telephone 152 at block 506. Testing system 100 plays, for example, an audio prompt that requests the person to dial one or more dual tone multiple frequency (DTMF) digits on telephone 152 to confirm that the call has been answered at the expected location. Testing system 100 further plays, for example, an audio prompt that specifies the kind of image that should be displayed in a timely manner on user workstation 150 and requests the person to dial one or more DTMF digits on telephone 152 to indicate the presence or absence of the image and the timely presentation of the image. Testing system 100 may further play an audio prompt that specifies ANI, DNIS, or related information that should be displayed in certain locations in the image on user workstation 150 and requests the person to dial one or more DTMF digits on telephone 152 to indicate the presence or absence of the information in the image and the timely presentation of the information. Testing system 100 may also play an audio prompt that specifies ANI, DNIS, or related information that should be displayed in certain locations in an image on telephone 152 and requests the person to dial one or more DTMF digits on telephone 152 to indicate the presence or absence of the information in the image. Testing system 100 may also play an audio prompt that specifies ANI, DNIS, or related information that should have been heard by the person as an audible message from the user telephone system at the beginning of the telephone call and requests the person to dial one or more DTMF digits on the telephone 152 to indicate the presence or absence of the information in the image. Testing system 100 may also play an audio prompt that specifies how long the telephone call waited before being answered and/or other related information for evaluation by the person and requests the person to dial one or more DTMF digits on telephone 152 to indicate the presence or absence of the information in the image.

At block 508, testing system 100 stores the non-speech responses from the person for reporting, evaluation, and other purposes. Testing system 100 may store other information such as answer delay times and other time intervals for reporting, evaluation, and other purposes. At block 510, the method determines whether there are more queries to execute. If there are more queries, the method returns to block 506. Otherwise, the method proceeds to evaluate the responses at block 512 and ends the process at block 514.

In some cases, the test telephone call may be routed to voice response system 118, network services 170, voice message system 132, or other system before the call is routed to the telephone 152. The other call prompting system or service may answer the telephone call and prompt testing system 100 to dial DTMF or other digits that specify the purpose of the call, an account number, or other information. The test telephone call may then be transferred or routed to or through user telephone switching system 112 for handling as described above. Any information gathered by the other call prompting process may become a factor in the call routing decisions. Any information gathered by the other call prompting process and subsequent call routing decisions may become information that is provided by testing system 100 to the person using telephone 152 and prompted by testing system 100 for confirmation by the person.

In some cases, the test telephone call may be routed to telephone 152 and handled by an automated system or process that functions in a similar manner as a person using telephone 152. This automated replacement for a person may typically involve user workstation 150 in the process of verifying that the expected screen images and information are displayed on user workstation 150 and displayed in a timely manner. In some cases, the nature of the prompting provided by the testing system 100 may change to make more use of DTMF or other digits for interaction with the automated equivalent of the person using telephone 152.

In addition, some steps of the test call process may involve audio interaction where audio time analysis is used to determine that the tested subsystem, service or process of telecommunications system 102 is performing correctly. This use of audio time analysis may typically include steps of any interaction with a voice response system 118 or other call prompting system or service. This use of audio time analysis may further typically include steps of any interaction with pre-recorded speech audio that may automatically be played in lieu of the person speaking a greeting when they answer telephone 152. This use of audio time analysis may further include steps of any interaction with pre-recorded speech audio that may be played by an automated system or process in lieu of a person using telephone 152.

Figure 6:
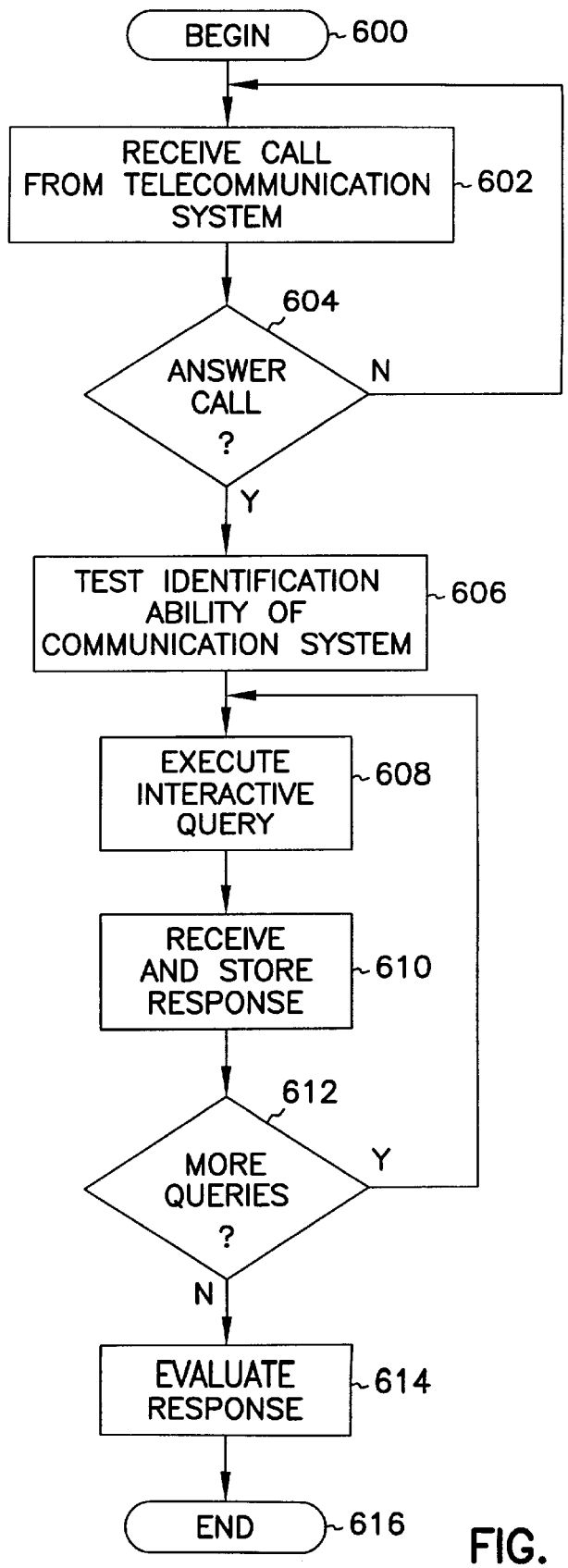
FIG. 6 is a flow chart that illustrates an embodiment of a method for testing automated calling or dialing systems according to the teachings of the present invention.

FIG. 6 is a flow chart that illustrates an embodiment of a method for testing automated calling or dialing systems. According to this method, test calls are received by testing system 100 from a calling system, e.g., outbound dialer 164. Testing system 100 responds to the calls in one or more of the following ways:

not answering a test call;

in response to a test call, causing a busy signal or other call progress tone to be returned to the calling system;

answering a test call after some period(s) of delay;

after answering a test call, playing speech audio, other audio tones, and silence in patterns designed to test the performance of the calling system in determining the nature of the answering person or device;

answering a test call, playing speech audio to the live person who is working with the calling system that specifies the called telephone number, the length of time that the call has been waiting to be answered, or other related information;

playing speech audio to the live person who is working with the calling system that specifies the information that is desired, the type of business transaction, the kind of related computer screen presentation that should be on the associated computer workstation, the information that should be present in certain data fields, and other related information;

playing one or more speech audio prompts that request certain inputs or responses from the live person who is working with the calling system that indicate certain information about the operation of the automated calling process and related presentation of computer information;

receive and evaluate one or more inputs or responses from the live person who is working with the calling system, respond interactively to the responses, and store the information for reporting purposes;

after answer, hang up the test call at specified times or points in the test sequence.

The method begins at block 600. At block 602, testing system 100 receives of one or more test telephone calls from outbound dialer 164 or other source of telephone calls. These test telephone calls may be made directly from outbound dialer 164, through user telephone switching system 112, or through some other means such as public or private telephone network 104. A call routing control system 140, a computer telephone integration server 148, or other system(s) may have a role to play in the routing decisions.

At block 604, testing system 100 determines whether to answer the incoming call. Testing system 100 tests the function of outbound dialer 164 by responding to the incoming test telephone calls by not answering the call, answering the calls after some fixed, variable, or random period of delay, causing a busy signal or other call progress tone to be returned to outbound dialer 164, or other related response. A fixed, variable, or random pattern of the responses to the incoming calls may be used to test outbound dialer 164 in different ways. If the test call is not answered, the method returns to block 602. If the test call is answered, the method proceeds to block 606.

For the test calls that are answered, testing system 100 plays, for example, speech audio, other audio tones, and silence in patterns designed to test the performance of outbound dialer 164 to determine the nature of the answering person or device at block 606. Outbound dialer 164 attempts to transfer or connect the telephone call to a telephone 152 to create a conversation between testing system 100 and the person using telephone 152. Outbound dialer 164 may also cause certain information to be displayed in an image on user workstation 150 that is associated with telephone 152. The information displayed on user workstation 150 is intended to inform the person about the nature of the called party and may also provide written scripts about possible conversation language for use with the called party.

Testing system 100 determines that the call has been transferred or connected to a person at telephone 152 and initiates an interactive transaction with the person through the telephone 152 at block 608. Testing system 100 may play an audio prompt that requests the person to dial one or more DTMF digits on telephone 152 to confirm that the call has been connected at the expected location. Testing system 100 further plays, for example, an audio prompt that specifies the kind of image that should be displayed in a timely manner on user workstation 150 and requests the person to dial one or more DTMF digits on telephone 152 to indicate the presence or absence of the image and the timely presentation of the image. Testing system 100 may further play an audio prompt that specifies ANI, DNIS, or related information that should be displayed in certain locations in the image on user workstation 150 and request the person to dial one or more DTMF digits on telephone 152 to indicate the presence or absence of the information in the image and the timely presentation of the information. Testing system 100 may also play an audio prompt that specifies ANI, DNIS, or related information that should be displayed in certain locations in an image on telephone 152 and requests the person to dial one or more DTMF digits on telephone 152 to indicate the presence or absence of the information in the image. Testing system 100 may also play an audio prompt that specifies ANI, DNIS, or related information that should have been heard by the person as an audible message from the user telephone system at the beginning of the telephone call and requests the person to dial one or more DTMF digits on the telephone 152 to indicate the presence or absence of the information in the image. Testing system 100 may also play an audio prompt that specifies how long the telephone call waited before being answered and/or other related information for evaluation by the person and requests the person to dial one or more DTMF digits on telephone 152 to indicate the presence or absence of the information in the image.

At block 610, testing system 100 stores the non-speech responses from the person for reporting, evaluation, and other purposes. Testing system 100 may also store other information such as answer delay times and other time intervals for reporting, evaluation, and other purposes. At block 612, the method determines whether more queries are to be used. If there are more queries, the method returns to block 608. If there are no further queries, the method proceeds to block 614 and evaluates the stored digit responses. The method ends at block 616.

In some cases, the answered test telephone call may be routed to a voice response system 118, voice message system 134, or other system before the call is transferred or connected to the telephone 152. The call prompting system, service, or outbound dialer 164 may play an audio message asking testing system 100 to wait for a real person, or prompt testing system 100 to dial DTMF or other digits that respond to questions, respond to prompts, provide an account number, or other information. The test telephone call may then be transferred or routed to telephone 152 for handling as described above. Any information gathered by the other call prompting process may become a factor in the call routing decisions. Any information gathered by the other call prompting process and subsequent call routing decisions may become information that is provided by testing system 100 to the person using telephone 152 for confirmation by the person.

In some cases, the test telephone call may be routed to telephone 152 and handled by an automated system or process that functions in a similar manner as a person using telephone 152. This automated replacement for a person may typically involve user workstation 150 in the process of verifing that the expected screen images and information are displayed on the user workstation 150 and displayed in a timely manner. In some cases, the nature of the prompting provided by testing system 100 may change to make more use of DTMF or other digits for interaction with the automated equivalent of a person using telephone 152.

In addition, some steps of the test call process may involve audio interaction where audio time analysis is important to the determination that the tested system, service or process is performing correctly. This use of audio time analysis may include steps of any interaction with a delay message, voice response system 118, or other call prompting system or service. This use of audio time analysis may further include steps of any interaction with pre-recorded speech audio that may automatically be played in lieu of the person speaking a greeting when they answer telephone 152. This use of audio time analysis may further include steps of any interaction with pre-recorded speech audio that may be played by an automated system or process in lieu of a person using telephone 152.

Testing system 100 may initiate the process of FIG. 6 by depositing a call-back request and/or related message by making a telephone call. Voice message system 132, for example, may answer the test call and prompt the caller to leave a voice message that requests a return telephone call, i.e. a call-back from a person using telephone 152 and user workstation 150. Testing system 100 may typically play speech audio that is recorded by the voice message system 134. The testing system 100 may further typically dial other digits that may include menu choices, a telephone number, an account number, or other information used to facilitate the call-back process. Testing system 100 may then hang up the test call and wait for a call-back telephone call. When testing system 100 determines that there is an incoming call on the telephone line with the specified call-back telephone number, testing system 100 tests the function of the call-back process by responding to the incoming test telephone calls in the manner described above with respect to FIG. 6.

Alternatively, testing system 100 may initiate the process of FIG. 6 by depositing a call-back request and/or related message by means of an Internet or other data communication process. Testing system 100 typically initiates one or more data communication connections to the user internet or intranet server 166. These test communications may be made directly to the user internet or intranet server 166 or through some other means such as an internet or intranet service provider 160. The user internet or intranet server 166, for example, may offer the option to request a return telephone call, i.e. a call-back from a person using telephone 152 and user workstation 150. The testing system 100 may enter text or other information that is stored by user internet or intranet server 166. The testing system 100 may further enter other information that may include menu choices, a telephone number, an account number, or other information used to facilitate the call-back process. The testing system 100 may then terminate the data communications connection and wait for a call-back telephone call. When the testing system 100 determines that there is an incoming call on the telephone line with the specified call-back telephone number, the testing system 100 tests the function of the call-back process by responding to the incoming test telephone calls in the manner described above with respect to FIG. 6.

Testing system 100 is also operable to the receive the requested information by facsimile rather than a call-back from a live person. The facsimile server 170, for example, may answer the test call of block 602 of FIG. 6 and prompt the caller to select the desired information from a menu or other indexing method. Testing system 100 may dial digits or play speech audio to indicate the desired selections. Testing system 100 may further dial other digits that may include menu choices, a telephone number, an account number, or other information used to facilitate the call-back process. Testing system 100 may then hang up the test call and wait for a call-back telephone call. When the testing system 100 determines that there is an incoming call on the telephone line with the specified call-back telephone number, testing system 100 initiates a modem communication process for receipt of a facsimile transmission. When the facsimile transmission is complete, testing system 100 hangs up the telephone line. Testing system 100 typically evaluates facsimile header information, duration and speed of the transmission, cover sheet information, the number of pages, and other information to evaluate the success of the facsimile call-back process. Optical character recognition software may also be used by testing system 100 to determine the content of the facsimile transmission in order to evaluate the success of the facsimile call-back process.

Figure 7:
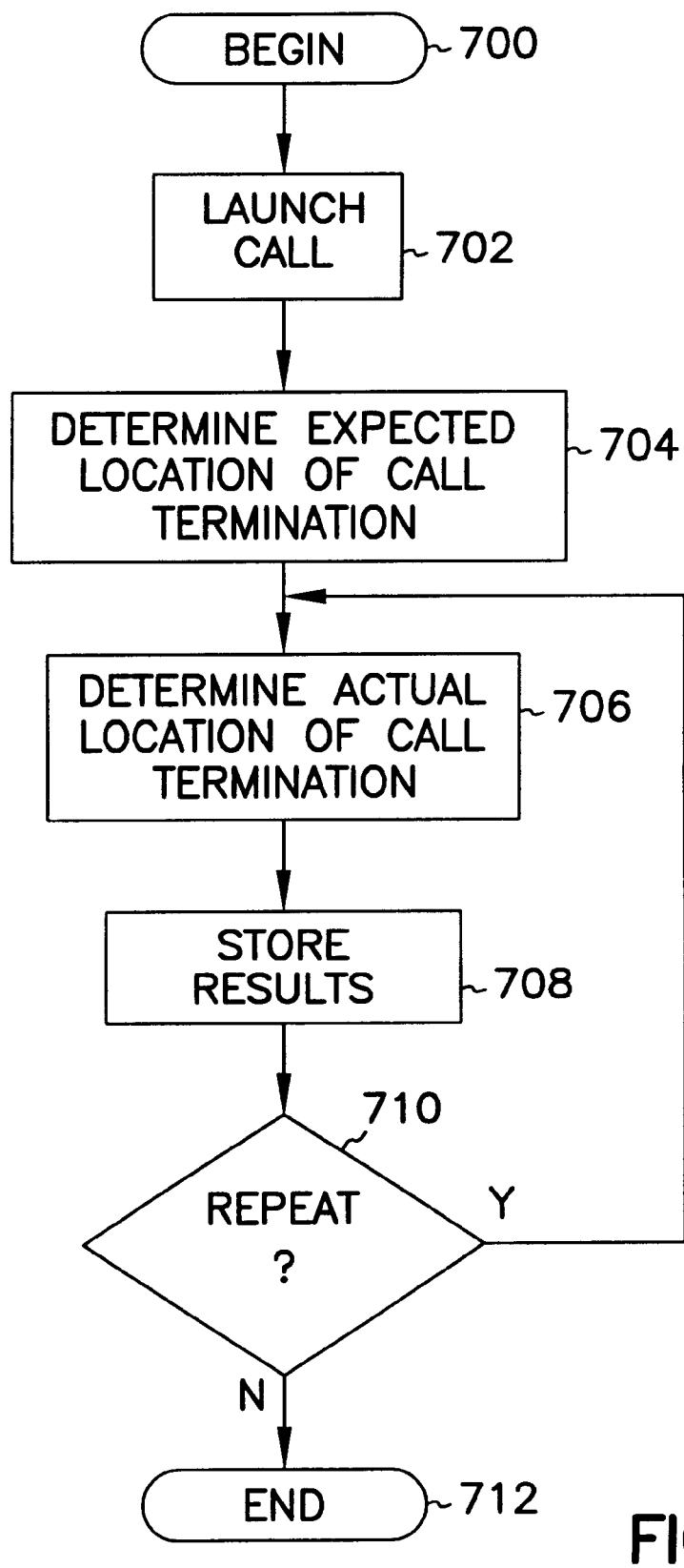
FIG. 7 is a flow chart that illustrates an embodiment of a method of testing automated routing control arrangements or other telecommunications functions according to the teachings of the present invention.

FIG. 7 is a flow chart that illustrates an embodiment of a method of testing automated routing control arrangements or other telecommunications functions. The method begins at block 700. At block 702, testing system 100 launches one or more test telephone calls to the user telephone switching system 112 or another system or device. These test telephone calls may typically be made directly to user telephone switching system 112 or through some other means such as a public or private telephone network 104. User telephone switching system 112 or public or private switched telephone network 104 makes routing decisions about connection of the incoming call to a network service 170, a voice response system 118, or other system or service that is designed to connect the caller with an operator in one of a number of physical locations. Call routing control system 140, computer telephone integration server 148, or other system(s) may have a role to play in the routing decisions. These decisions may be based, in part, on the volume of traffic being handled by each physical location at the time the call is received. The call routing decision is made using call routing decision logic.

Testing system 100 evaluates the effectiveness and performance of the call routing decision logic and process. At block 704, the method determines the expected location to which the call should be routed. This is accomplished using data on the volume of calls at each physical location and the call routing algorithms. At block 706, the method determines the actual location of the call termination of the routing process. In some cases, the final destination of the routing process causes a speech audio message to be played, the nature of which is determined by testing system 100 through the use of audio time analysis. The results are stored at block 708.

At block 710, a decision is made as to whether additional calls are to be launched. If additional calls are to be launched, the method returns to block 702. If no additional calls are to be launched, the method ends at block 712.

Figure 8:
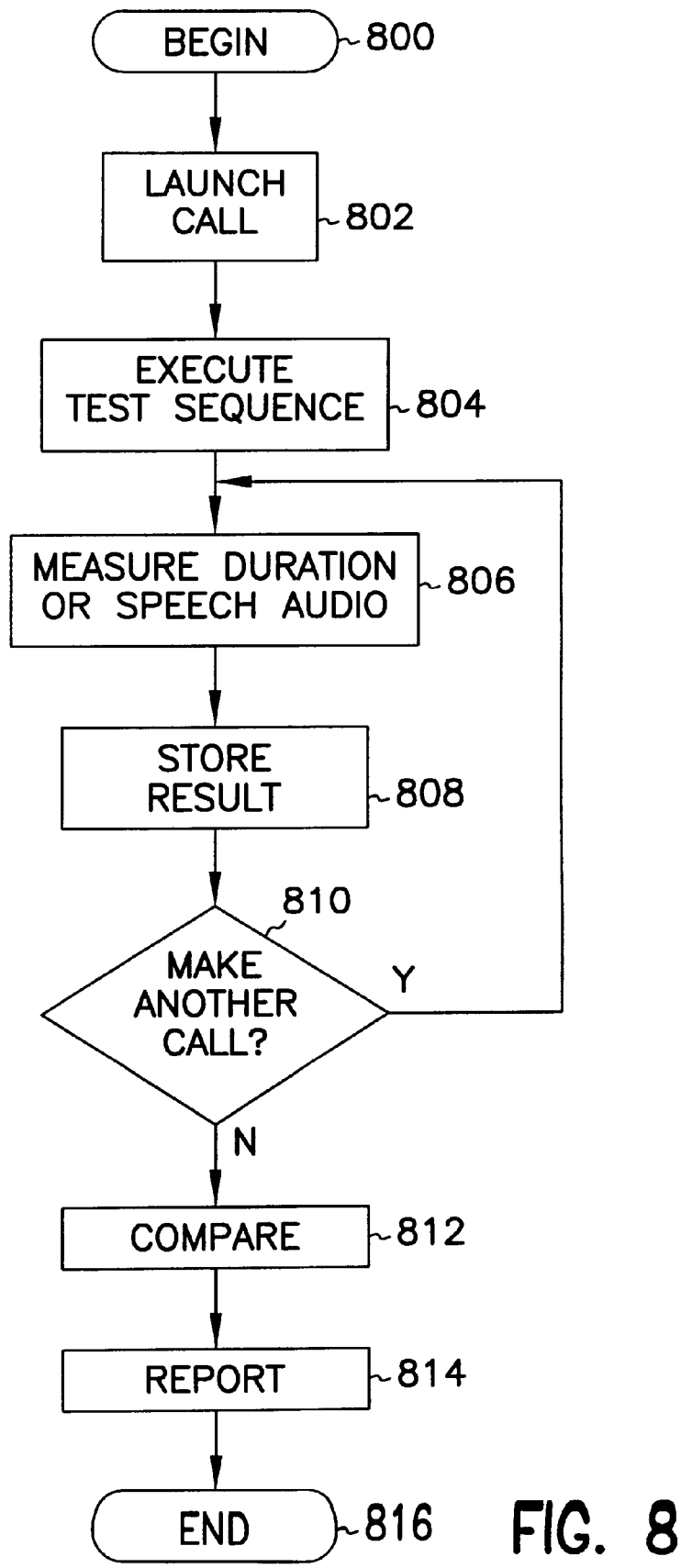
FIG. 8 is a flow chart that illustrates an embodiment of a method of testing the availability or service level of a telecommunication system that during normal operation according to the teachings of the present invention.

FIG. 8 is a flow chart that illustrates an embodiment of a method of testing the availability or service level of a telecommunication system that during normal operation. The method begins at block 800. At block 802, testing system 100 launches one or more test telephone calls or data communication connections to a system that is in normal production and operation, e.g., a voice response system 118, internet or intranet server 166, or some other telecommunications system or service. These test telephone calls may be made directly, or through the user telephone switching system 112, an internet or intranet service provider, or through some other means such as a public or private telephone network 104.

At block 804, testing system 100 executes a test sequence such as described above with respect to the test sequence of FIG. 4. The testing system 100 has previously made or received telephone test calls during which the possible speech audio responses or other responses at each step of the test process have been measured by means of audio time analysis and the measurement values stored for comparison to measurements made on future test calls. In addition, other criteria may be established and stored in testing system 100 for comparison to measurements made on future test sequences and evaluation of proper expected operation of the telecommunications system being tested. These additional criteria may include delay time or response time criteria at each step of the testing process. These additional criteria may further include minimum availability criteria and other operational parameters. One typical point of interest in the test process is any interaction between the telecommunications system being tested and a computer application host 154, file server 156, or other source of information or processing tasks.

At block 806, the method measures the duration of speech audio from telecommunications system 102. At block 808, testing system 100 stores the measured value. The method determines at block 810 whether an additional call should be made. If an additional call is to be made, the method returns to block 802. If no additional calls are to be made, the measurements are compared with previously measured results and other criteria to determine whether or not the telecommunications system performed in an acceptable manner. At block 814, a report is created that provides the results of the test. In the event of failure or other conditions in production telecommunications systems that may be determined in the testing process described above, people or automated systems are notified using:

Telephone calls to people where speech audio messages are played that communicate and declare the conditions;

Further interaction with people to verify receipt of the notification information by interactively prompting the people to dial one or more DTMF digits;

Further interaction with people or automated systems to make additional notification attempts if the people fail to verify receipt of the notification information;

Telephone calls to automated systems where speech audio, DTMF digits, or other audio information are played to communicate and declare the test result conditions;

Further interaction with people or automated systems to make additional notification attempts if a notification call is unanswered or otherwise unsuccessful;

Internet, electronic mail, or other data communication methods are used to communicate and declare the test result conditions.

In the event that the tested telecommunications system performed in an unacceptable manner, testing system 100 attempts to notify people or automated system of the unacceptable performance. One typical way of performing the notification process is for the testing system 100 to launch a telephone call through user telephone switching system 112 to a telephone 152 or through a public or private switched telephone network to a telephone 158. If a person answers the telephone call, then a series of pre-recorded audio information messages may be played by testing system 100 that identify the telecommunications system that was tested, the telephone number that was dialed to start the test, the time and date of the test, the nature of the unacceptable performance, and other relevant information. The person then may be prompted to confirm receipt of the notification information by dialing one or more digits on telephone 152 or telephone 158. Failure of the person to confirm receipt of the notification information may result in additional notification actions on the part of testing system 100.

Another typical way of performing the notification process is for the testing system 100 to launch a telephone call through user telephone switching system 112 or through public or private switched telephone network 104 to voice message system 132 or voice response system 118 or similar system. Testing system 100 may interact with voice message system 132 to play pre-recorded speech audio information messages that identify the telecommunications system that was tested, the telephone number that was dialed to start the test, the time and date of the test, the nature of the unacceptable performance, and other relevant information. Additional DTMF or other inputs from testing system 100 to voice message system 134 may be used to provide details of a failure condition, make a message take on an urgent status, initiate an automated radio paging process or other means of distributing the notification information to a person or other automated systems.

Another typical way of performing the notification process is for testing system 100 to initiate one or more data communication connections to user internet or intranet server 166. These test communications may be made directly to user internet or intranet server 166 or through some other means such as internet or intranet service provider 160. The data communications connections may serve the purpose of transmitting electronic mail messages or other electronic information that ultimately inform a person or an automated system about the unacceptable performance of the telecommunications system that was tested.

In addition, some steps of the notification process may involve audio interaction where audio time analysis is used to determine that a notification telephone call is succeeding with the intended notification process. This use of audio time analysis may include steps of any interaction with a delay message, voice message system 134, voice response system 118, or other call prompting system or service. This use of audio time analysis may further include steps of any interaction with pre-recorded speech audio that may automatically be played in lieu of the person speaking a greeting when they answer telephone 152. This use of Audio Time Analysis may further include steps of any interaction with pre-recorded speech audio that may be played by an automated system or process that in lieu of a person using telephone 152 or telephone 158.

The method ends at block 816.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the test sequences used to test a specific system may be varied without departing from the spirit and scope of the invention. Further, techniques other than call progress detection may be used to measure the duration of speech audio. It is noted that the testing system can be coupled directly or indirectly to the system under test.

What is claimed is:

1. A method for testing a telecommunications system, the method comprising:
   initializing parameters of a telecommunications tester, including initializing a silence timeout parameter;
   executing a test sequence from instructions stored in the telecommunications tester;
   measuring the duration of at least one speech audio signal or period of silence produced by the telecommunications system, wherein periods of silence less than the value of the silence timeout parameter are ignored while measuring the duration of at least one speech audio signal; and
   comparing the result of the measuring step with an expected value to determine whether the appropriate speech audio was produced by the telecommunications system.

2. The method of claim 1, wherein initializing the silence timeout parameter comprises setting the silence timeout parameter to a value between zero and five seconds in increments of one millisecond.

3. The method of claim 1, wherein executing a test sequence comprises providing signals to the telecommunication system to elicit speech audio signals.

4. The method of claim 1, wherein measuring the duration of at least one speech audio signal or period of silence comprises measuring the duration with a call progress detection circuit.

5. The method of claim 1, and further comprising storing the measured duration of the speech audio or period of silence.

6. The method of claim 1, wherein comparing the result of the measuring step with an expected value includes comparing the result of the measuring step with a set of expected values to determine which of the members of the set of expected values was produced by the telecommunications system.

7. The method of claim 1, wherein measuring the duration of at least one speech audio signal or period of silence comprises measuring the duration of a plurality of speech audio signals or periods of silence to create a number of values for comparison with expected values.

8. A method for testing a telecommunications system that provides visual information regarding a caller to an operator, the method comprising:
   launching a telephone call to the telecommunications system which routes the call to an operator and displays visual information for the operator;
   executing a sequence of interactive queries over the telecommunications system;
   storing signals that represent non-speech responses to the queries; and
   evaluating the responses provided by the operator over the telecommunications system.

9. The method of claim 8, and further comprising routing the call to the telecommunications system to a voice response system for gathering information about the caller to be displayed to the operator.

10. The method of claim 8, and further comprising measuring the time duration of at least one speech audio signal or period of silence generated by the telecommunications system during the sequence of interactive queries.

11. The method of claim 8, wherein executing a sequence of interactive queries comprises playing speech audio prompts that ask the operator to identify selected portions of the displayed information.

12. A method for testing automated calling systems, the method comprising:
   receiving a call from the automated calling system;
   determining whether to answer the call;
   when not answering the call, generating a busy signal; and
   when answering the test call after some period of delay,
      selectively providing a signal to the telecommunications system from a set of signals expected to be received by the telecommunications system so as to test the ability of the automated calling system to determine the nature of the answering person or device,
      executing a number of interactive queries with the telecommunications system,
      receiving and storing the non-speech responses the telecommunications system, and
      evaluating the responses.

13. The method of claim 12, wherein executing a number of interactive queries with the telecommunications system includes playing an audio prompt that requests an operator to dial digits to indicate the location at which the call is terminated.

14. The method of claim 12, wherein executing a number of interactive queries with the telecommunications system includes playing an audio prompt that requests an operator to dial digits to identify the presence of information displayed to an operator.

15. The method of claim 12, wherein executing a number of interactive queries with the telecommunications system includes playing an audio prompt that requests an operator to dial digits to identify the presence of audio information provided to the operator.

16. The method of claim 12, wherein receiving and storing responses includes analyzing speech audio by measuring the duration of the speech audio and comparing the measurement with expected values.

17. The method of claim 12, and further comprising providing a request to the telecommunications system to place the call to a testing system.

18. The method of claim 17, wherein providing a request to the telecommunications system comprises depositing a message with the telecommunications system over a data communication network.

19. The method of claim 18, wherein depositing a message with the telecommunications system over a data communication network comprises depositing a message with the telecommunications system over the internet.

20. The method of claim 18, and further including initiating a modem communication process for receipt of a facsimile from the telecommunications system.

21. A method for testing the service level of an active telecommunication system, the method comprising:

initializing parameters of a telecommunications tester, including initializing a silence timeout parameter;

launching a telephone call to the telecommunications system during normal operation of the telecommunications system;

executing a test sequence;

measuring the duration of at least one speech audio response signal or period of silence generated by the telecommunications system during the test sequence, wherein periods of silence less than the value of the silence timeout parameter are ignored while measuring the duration of at least one speech audio signal;

storing the measurements;

repeating the launching, executing, measuring and storing to obtain additional measurements on the operation of the telecommunications system;

comparing the measurements with expected values; and reporting the results of the comparison.

22. The method of claim 21, wherein reporting results comprises launching a telephone call and playing a speech audio message that identifies errors in the operation of the telecommunications system.

23. The method of claim 22, and further comprising prompting a recipient of the call to dial digits to acknowledge receipt of the message.

24. The method of claim 21, wherein reporting results comprises depositing a message with a data communication system.

25. The method of claim 24, wherein depositing a message with a data communication system comprises depositing an e-mail message.

26. The method of claim 25, wherein depositing an e-mail message comprises depositing an e-mail message over the internet.

* * * * *

UNITED STATES PATENT AND TRADEMARK OFFICE
CERTIFICATE OF CORRECTION

PATENT NO. : 5,933,475
DATED : Aug. 3, 1999
INVENTOR(S) : William A. Coleman

It is certified that error appears in the above-identified patent and that said Letters Patent is hereby corrected as shown below:

At. Col. 20, line 65, following "responses" please insert --of--.

Signed and Sealed this

Third Day of April, 2001

Attest:

NICHOLAS P. GODICI

*Attesting Officer*  *Acting Director of the United States Patent and Trademark Office*